United States Patent [19]
Goldsmith

[11] Patent Number: 6,064,990
[45] Date of Patent: May 16, 2000

[54] SYSTEM FOR ELECTRONIC NOTIFICATION OF ACCOUNT ACTIVITY

[75] Inventor: Kevin Scott Goldsmith, Tucson, Ariz.

[73] Assignee: International Business Machines Corporation, Armonk, N.Y.

[21] Appl. No.: 09/052,371

[22] Filed: Mar. 31, 1998

[51] Int. Cl.[7] .................................................. H01J 3/00
[52] U.S. Cl. ................ 705/75; 705/16; 705/39; 705/44; 705/69; 340/825.33; 340/825.34; 379/91.01; 235/379; 235/380; 380/24; 902/40
[58] Field of Search ..................... 235/379, 420, 235/380; 380/24; 379/91.02, 91.01; 382/115; 705/18, 42, 44, 16, 17, 34, 39, 40, 52, 64, 69, 75; 902/24, 40; 340/825.34, 825.33

[56] References Cited

U.S. PATENT DOCUMENTS

| | | | |
|---|---|---|---|
| 3,852,571 | 12/1974 | Hall et al. | 235/379 |
| 4,075,460 | 2/1978 | Gorgens | 235/420 |
| 4,172,552 | 10/1979 | Case et al. | 235/380 |
| 4,675,815 | 6/1987 | Kuroki et al. | 379/37 |
| 4,678,895 | 7/1987 | Tateisi et al. | 235/379 |
| 5,053,607 | 10/1991 | Carlson et al. | 705/18 |
| 5,220,501 | 6/1993 | Lawlor et al. | 380/24 |
| 5,265,033 | 11/1993 | Vajk et al. | 395/200.36 |
| 5,455,407 | 10/1995 | Rosen | 235/380 |
| 5,473,143 | 12/1995 | Vak et al. | 235/380 |
| 5,500,890 | 3/1996 | Rogge et al. | 379/91.02 |
| 5,613,012 | 3/1997 | Hoffman et al. | 382/115 |
| 5,615,110 | 3/1997 | Wong | 705/38 |
| 5,677,955 | 10/1997 | Doggett et al. | 380/24 |
| 5,708,422 | 1/1998 | Blonder et al. | 340/825.34 |
| 5,710,834 | 1/1998 | Rhoads | 382/232 |
| 5,839,063 | 11/1998 | Lee | 455/410 |
| 9,052,371 | 6/1993 | Lawlor et al. | 380/24 |

*Primary Examiner*—Allen R. MacDonald
*Assistant Examiner*—Raquel Alvarez
*Attorney, Agent, or Firm*—David W. Victor; Konrad Raynes & Victor LLP

[57] ABSTRACT

Disclosed is a system for notifying a user of account activity, such as a withdrawal from a savings or checking account. A computer system maintains information on financial accounts and electronic user contact information for at least one of the financial accounts, such as a telephone number, e-mail address or pager number. Information on a transaction with respect to one of the financial accounts is received and processed. The computer system then processes the information on the transaction and generates an electronic message providing information on the transaction. The user contact information for the financial account involved in the transaction is processed. The message is then electronically transmitted to the location identified by the user contact information for the financial account.

28 Claims, 4 Drawing Sheets

FIG. 4

SYSTEM FOR ELECTRONIC NOTIFICATION OF ACCOUNT ACTIVITY

1. FIELD OF THE INVENTION

The field of the present invention relates to a system for providing electronic notification of account activity concerning a financial account.

2. BACKGROUND OF THE RELATED ART

Security is one of the foremost concerns for electronic financial transactions, such as banking, credit card purchases, investments, etc. As of date security approaches have focused on authentication systems. When a user logs on to a system, the user provides an account password. If the user provides the correct password, an encrypted authentication token is provided to the user. The user presents this authentication token to conduct financial transactions for those accounts to which the token permits access. These authentication systems are predicated on preventing unauthorized access. However, such an approach does not address handling unauthorized access once a security breach has occurred.

A user may detect unauthorized account activity when accessing the account and reviewing account activity. For instance, many banking institutions offer on-line banking services and software, such as Wells Fargo & Company's online banking service WELLS FARGO ONLINE®, that allow a user to review account activity over the phone or through the Internet. However, users often do not regularly access their account. Therefore, in the event that the authentication system is breached, numerous fraudulent transactions may occur before the user accesses the account and learns of the unauthorized activity. Financial institutions do provide account statements via the mail at periodic intervals. However, numerous fraudulent transactions may occur before the user reviews the periodic, e.g., biweekly or monthly, statements.

Typically, for a user to learn of authorized account activity such as withdrawals from a second named party to the account or of any bank fees, the user must contact the financial institution, via phone, mail or the Internet, and review the account or wait until receiving a monthly statement. In such prior art account management systems, users with minimal account capitalization may not be made immediately aware of any banking fees subtracted or authorized withdrawals that would cause their account to be overdrawn.

SUMMARY OF THE INVENTION

To address the shortcomings in the prior art described above, preferred embodiments of the present invention provide a system for notifying a user of account activity. A computer system maintains information on financial accounts and electronic user contact information for at least one of the financial accounts. Information on a transaction with respect to one of the financial accounts is received and processed. The computer system then processes the information on the transaction and generates a message providing information on the transaction. The user contact information for the financial account involved in the transaction is processed. The message is then electronically transmitted to the location identified by the user contact information for the financial account.

In further embodiments, the financial transaction involves a decrement to the financial account. In yet further embodiments, the steps of generating the message, processing the user contact information, and electronically transmitting the message are performed immediately after receiving the information on the transaction and processing the transaction information.

The preferred embodiments of the present invention provided a system for immediately notifying a user of account activity with respect to one of the user's financial accounts. This way, if the authentication security system for the financial account is breached, the user is immediately notified of any unauthorized account activity. The preferred embodiments, thus, provide an added layer of security in the case that the authentication system is breached. Moreover, preferred embodiments may also provide the user immediate notification of authorized account activity, such as fees and access by authorized parties. This immediate access allows users to monitor their account to avoid being overdrawn.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
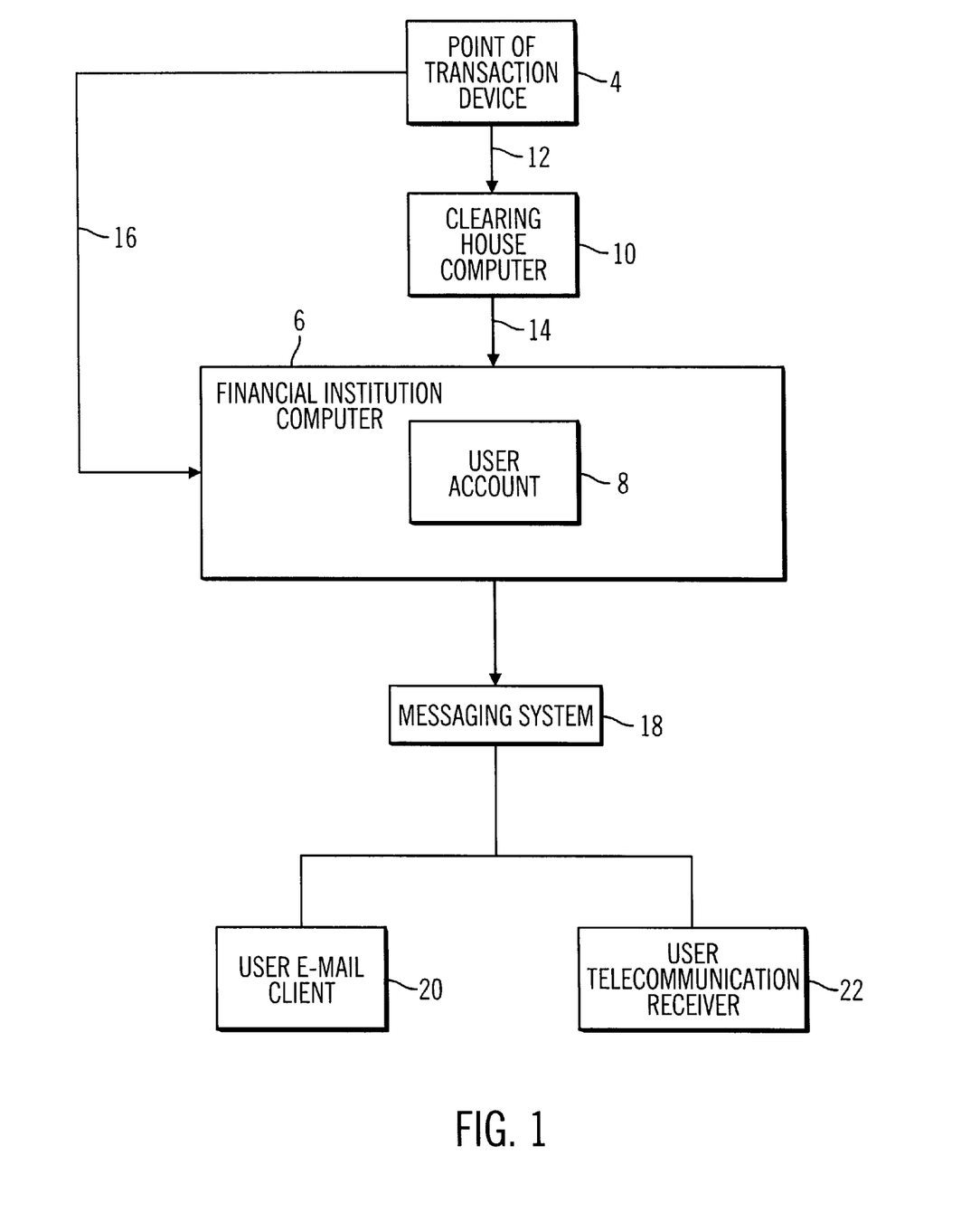
FIG. 1 is a block diagram illustrating a preferred software and hardware environment in which preferred embodiments of the present invention are implemented.

FIG. 1 illustrates a preferred hardware and software environment in which preferred embodiments of the present invention are implemented. A point of transaction 4 is a location where a financial transaction occurs. The point of transaction device 4 may be an Automated Teller Machine (ATM), a machine for processing credit card purchases at a business venue, or a computer or telephone providing on-line access to an account. Certain transactions may require security authentication or a password. For instance, if a user is accessing a bank or investment account to withdraw funds, the user typically must provide a secured password. On the other hand, for credit card purchases, the user typically does not have to provide authentication to access the account.

The transaction that is initiated at the point of transaction device 4 may be transferred directly to a financial institution computer system 6 that maintains a data base of user accounts 8 or to a centralized clearing house computer 10. The clearing house computer 10 processes transactions from numerous point of transactions and routes the transaction to a subject financial institution computer 6. For instance, if a user accesses an ATM account, the clearing house computer 10 for the ATM system receives the transaction and routes the transaction to the financial institution computer 6 maintaining the accessed account 8. In other embodiments, the point of transaction device 4 may link directly to the financial institution computer 8, such as the case if a telephone or home computer is used to obtain direct on-line access to an account 8. In still further embodiments, the transaction may be initiated by the financial institution, such as a credit of fees to an account. In this way, the user can be notified of all account activity, including decremental activity from a third person or the financial institution. Account holders with low account levels may want to be notified of any bank fees subtracted from their account to insure that they do not become overdrawn.

In preferred embodiments, the point of transaction device 4 constitutes a dedicated electronic device, such as an ATM or credit/debit card processing machine, in which the transaction is initially entered. The clearing house computer 10 comprises a large scale computer system, such as a mainframe computer system, for processing and routing electronic transactions received from point of transaction devices 4.

In preferred embodiments, the financial institution computer 6 is comprised of a large scale computer system, such as a mainframe computer system, for processing multiple transactions for a multitude of user accounts 8. The financial institution computer system 6 includes a database management program, wherein each user account 8 is maintained within the database management program. If the point of transaction 4, clearing house 10 or financial institution 6 are comprised of electronic and computer devices, then the communication paths 12, 14, 16 therebetween may be any electronic communication protocol known in the art, including modem communication protocols, LAN, WAN, TCP/IP, the Internet, etc.

Alternatively, any of the communication paths 12, 14, 16 may be a non-electronic communication means such as the mail system or messenger. Further, the communication paths 12, 14, 16 may be different. For instance, in alternative embodiments, the point of transaction 4 may be a non-electronic method, such as a credit card purchase that the vendor mails to the clearing house 10 or financial institution 6. In such case, the communication paths 12 or 16 are the mail system. Alternatively, the clearing house 10 may mail the financial institution 6 the transaction. In such case, the communication path 14 is the non-electronic mail system.

Once the financial institution 6 receives the transaction, e.g., a withdrawal, deposit, transfer of funds, debit, credit, sale of securities, purchase, etc., the financial institution computer 6 will then process the transaction and execute program logic to generate an electronic message to transmit to a messaging system 18 to which the user subscribes. The messaging system 18 may be any suitable electronic mail delivery system including a message transfer agent that stores and forwards messages and a message store that holds mail for selective retrieval and deletion. Examples of messaging systems include Lotus Development Corporation's cc:Mail™, Microsoft Mail™, etc. The messaging system 18 may also be a messaging system managed by an Internet Service Provider (ISP) to which the user subscribes.

In preferred embodiments the messaging system 18 forwards the electronic mail from the financial institution computer 6 to a user e-mail client 20, which may be a computer capable of receiving e-mail from the messaging system 18 through a mail protocol, e.g., Simple Mail Transfer Protocol (SMTP). In preferred embodiments, the user e-mail client 20 maintains a continual connection to the messaging system 20 so that new e-mail is automatically passed to the user while the user is using the machine including the e-mail client 20. In further embodiments, the messaging system 18 includes the capability to generate a message via a telecommunication pathway to notify the user at a user telecommunication receiver 22 that a message has been received. The user telecommunication receiver 22 may be a pager or telephone. In this way, the user will learn of electronic mail messages immediately, thereby minimizing the time the user learns of unauthorized account activity or if the account is reaching dangerously low levels.

In alternative embodiments, the messaging system 18 may be associated with the financial institution and housed in the same facility housing the financial institution computer 6. In such embodiments, upon receiving e-mail notification of account activity, the financial institution's messaging system would generate a further notification via a telecommunication pathway. In such case, the user would have to provide contact information for such telecommunication notification, e.g., a phone number or pager number. For instance, the messaging system 18 could transmit a message to the user telecommunication receiver 22 that an e-mail has been received. The message to the telecommunication receiver 22 may indicate that the received e-mail concerns account activity. The user then could immediately check the user e-mail client 20 to review the nature of the account activity. In yet further embodiments, the messaging system 18 may include information on the nature of the transaction within the message transmitted to the user telecommunication receiver 22.

In still further embodiments, the financial institution computer 6 may include alternative communication means such as telephone or pager to immediately notify the user via such means of account activity without having to first generate an e-mail. For instance, if the user provides a telecommunication contact code, such as a telephone number, a pager number, and an e-mail address, the financial institution computer 6 would execute a program to contact the user via each of these means. The user contact information may include an indication of the type of communication, e.g., e-mail, alpha-numeric pager, numeric pager, telephone, etc. Preferably the user e-mail client 20 and/or telecommunication receiver 2 is a device the user utilizes on a regular basis, such as daily, to insure that the user receives immediate notification of the account 8 activity.

In preferred embodiments, immediately after the financial institution computer 6 receives notification of account activity such as a withdrawal, purchase, etc., the financial institution computer 8 will execute a program to transmit a message to the e-mail contact the user provides to notify the user of the account activity. The user may provide more than one electronic mail notification addresses at different locations where the user receives e-mail.

In this way, the preferred embodiments provide the user immediate notification of account activity, particularly decremental account activity, when the financial institution computer 6 processes the withdrawal or purchase on the user account 8. The user, thus, obtains immediate notification of account access and would learn of any unauthorized accesses on the first access. The preferred embodiments provide a secondary layer of security when the authentication system is breached, i.e., someone accesses the users account number and password, or forges the user's signatures as part of a fraudulent credit card purchase.

The preferred embodiments are further useful in detecting identity fraud when someone assumes the user's identity and starts accessing the user's banking, investment, credit card or other accounts. Once the user receives notification of a transaction the user did not authorize, the user may then immediately contact the financial institution 6 to report the fraud. In this way, persistent or continual fraudulent accesses over a lengthy period of time, i.e., using someone's credit card for a week or selling someone's life savings and transferring the funds, can be stopped.

In further embodiments, the financial institution computer 6 may generate a notification message to the current account contact addresses when a change is made to the contact information. For instance, when someone changes the e-mail notification for the account 8, the financial institution computer 6 would generate and transmit a message concerning such contact change to the pre-modification e-mail address. This notification would alert the user to an unauthorized alteration of the contact information.

Figure 2:
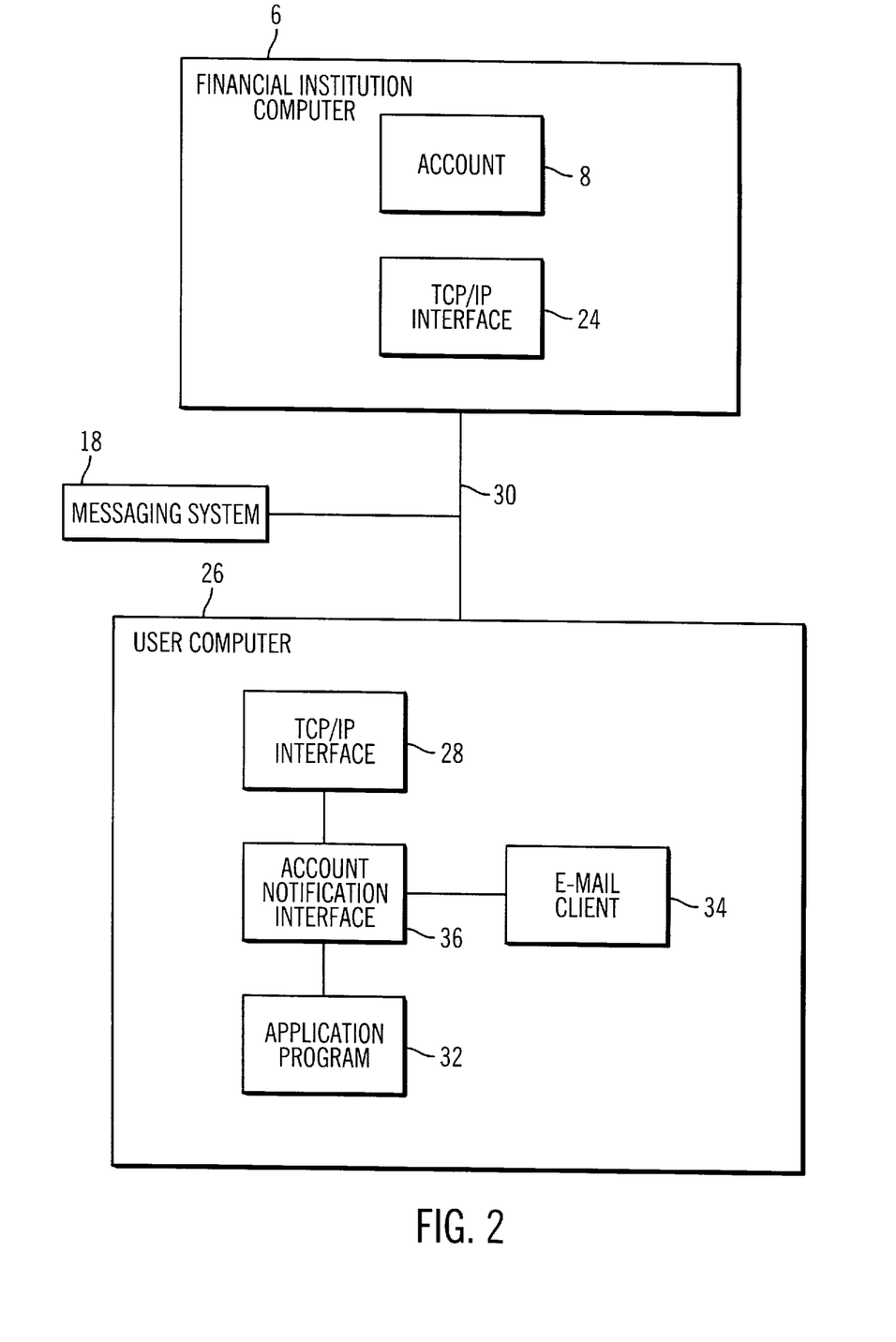
FIG. 2 is a block diagram illustrating a further preferred software and hardware environment in which preferred embodiments of the present invention are implemented.

FIG. 2 illustrates further detail of preferred embodiments of a user computer 26 that receives e-mail concerning account activity. The financial institution computer 6 includes information on the user account 8 and a TCP/IP interface 24 program. The TCP/IP interface 24 provides communication between the financial institution computer 6 and the messaging system 18. In alternative embodiments, the TCP/IP interface 24 may be any suitable communication interface and protocol known in the art, other than TCP/IP.

A user computer 26 includes a TCP/IP interface 28, or any other communication interface known in the art, to provide communication between the user computer 26, the messaging system 18, and the financial institution computer 6 via a transmission line 30, such as the Internet, LAN, WAN, etc. A display screen (not shown) is attached to the user computer 26 and displays information to the user. The user computer 26 further includes an operating system (not shown) and an application program 32. The operating system may be OS/2®, WINDOWS®, etc. OS/2 is a registered trademarks of IBM; WINDOWS is a registered trademark of Microsoft Corporation. The application program 32 may be a word processor, spreadsheet, personal finance software, and an e-mail client program 34, such as NOVELI, GROUPWISE™, LOTUS NOTES™, LOTUS CC:MAIL™, etc. NOVELL GROUPWISE is a trademark owned by Novell, Inc; LOTUS NOTES and LOTUS CC:MAIL are trademarks owned by Lotus Development Corporation. In embodiments where the user computer 26 maintains continual access to the transmission line 30, the e-mail client 34 may display a notification dialog box whenever an e-mail message is sent to the user computer 26. In embodiments where the user relies upon the e-mail client 34 to provide immediate notification of account 8 activity, the TCP/IP interface 28 would communicate directly with the e-mail client 34, which in turn would display a dialog box notifying the user of the account activity.

In further embodiments shown in FIG. 2, the user computer 26 includes an account notification interface 36 program which interfaces the TCP/IP interface 28 with the application program 32 to route account notification e-mail messages to the application program 32. The account notification interface 36 program could be invoked whenever the user boots-up or when the user executes the application program 32. The account notification interface 36 program would format and route the e-mail message to the application program 32. The application program 32 could then display a dialog box notifying the user of the account activity message. In certain embodiments, the data in the e-mail message may be in a format accessible to the application program 32. In such case, if the application program 32 maintains user account information, the application program 32 could access the account activity data in the message and update the user account information with the account activity data.

For instance, the application program 32 may be a financial spreadsheet program, e.g., Lotus Development Corporation's LOTUS 1-2-3™, or personal financial software such as Intuit Inc.'s QUICKEN™ personal finance software. In such case, the account activity data in the e-mail notification communicated from the financial institution computer 6 may be imported directly into a file managed by the application program 32 to update the user's account information maintained within the file used by the application program 32.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Logic To Electronically Notify User of Account Activity

Figure 3:
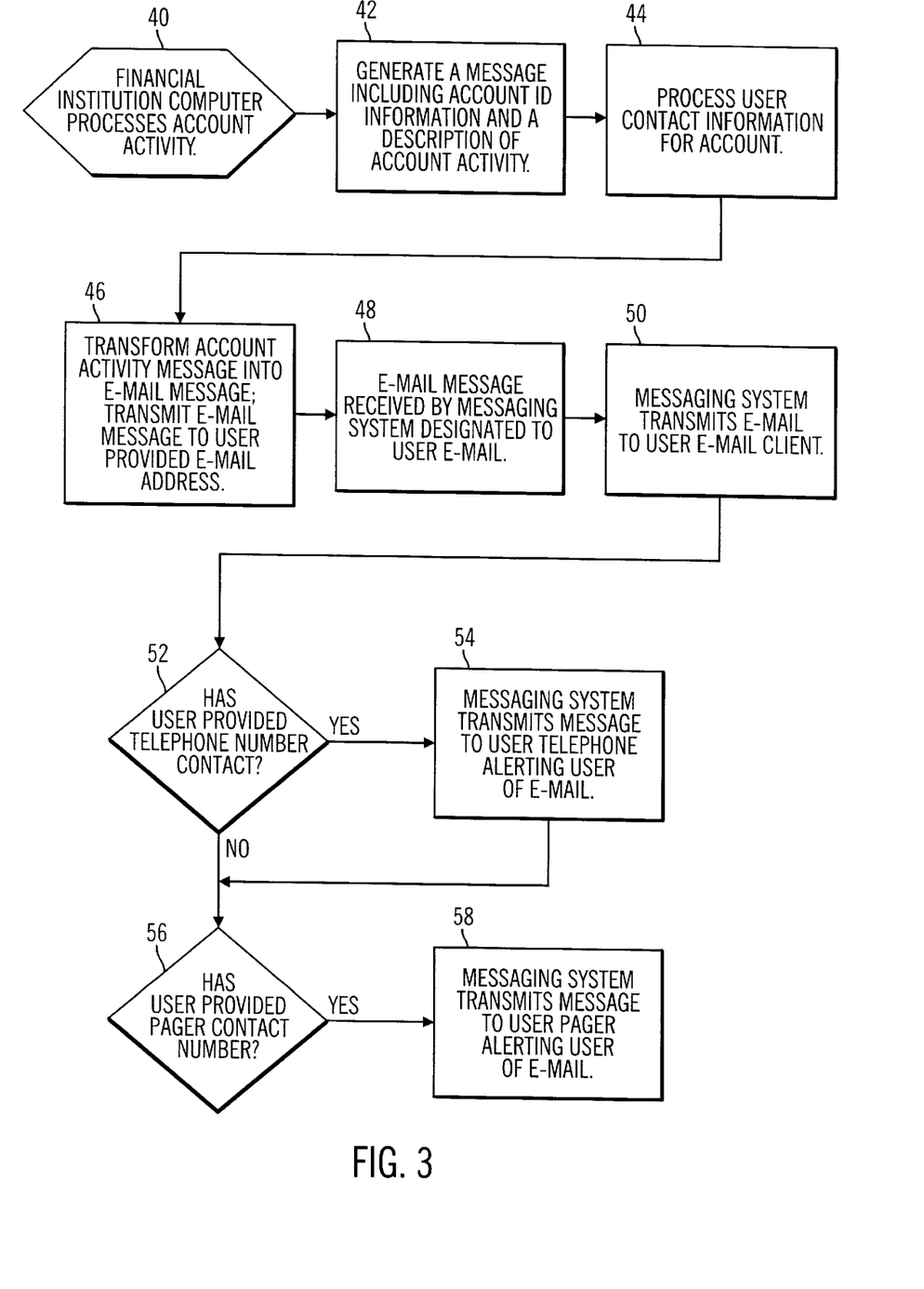
FIG. 3 is a flowchart showing logic for notifying a user of account activity in accordance with preferred embodiments of the present invention.
Figure 4:
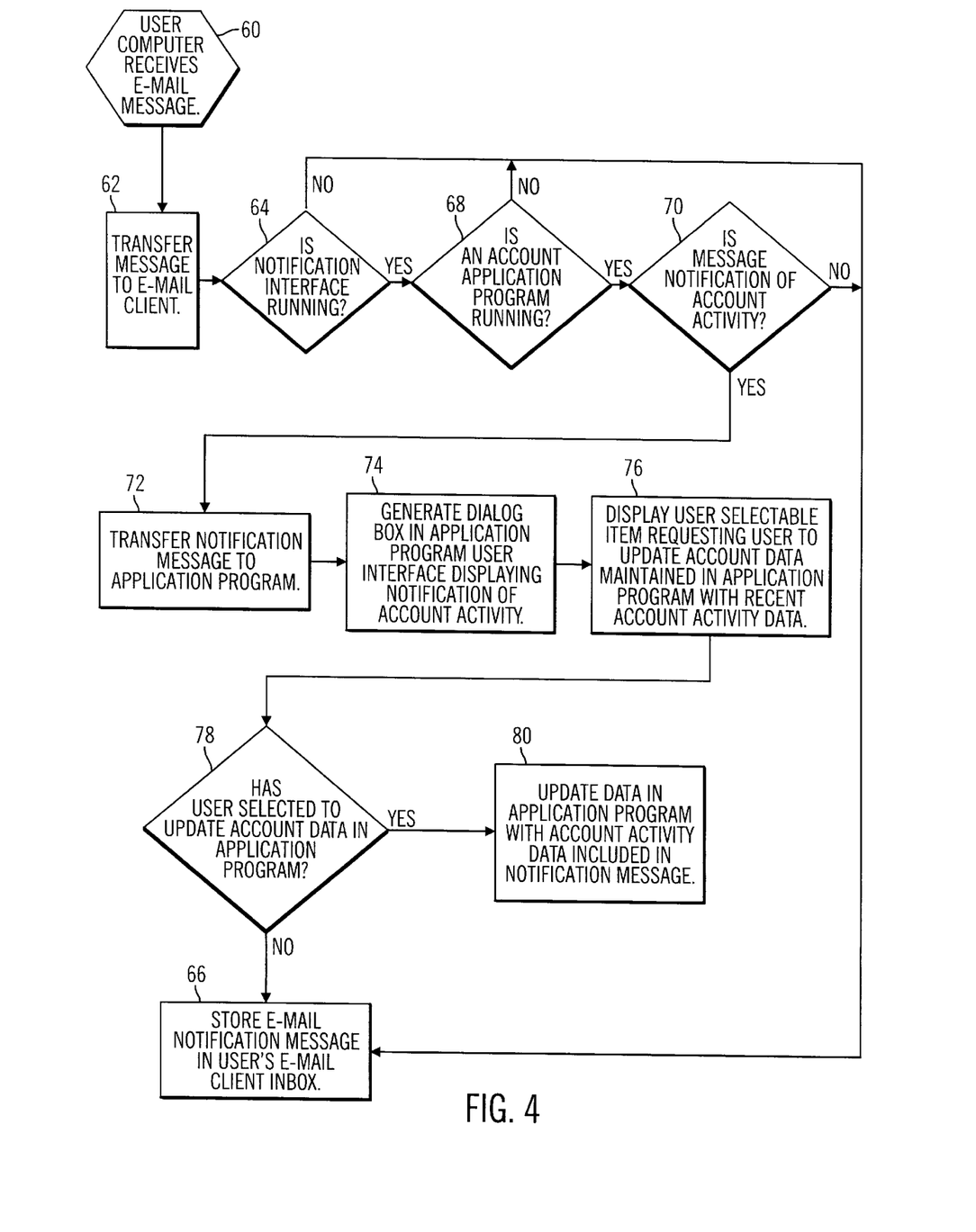
FIG. 4 is a flowchart showing logic for processing notification of account activity in accordance with preferred embodiments of the present invention.

FIG. 3 illustrates logic implemented in the financial institution computer 6 and messaging system 18 to generate and transmit an electronic notification to the user. FIG. 4 illustrates logic implemented in the user computer 26 to process a notification of account 8 activity from the financial institution computer 6. Those skilled in the art will recognize that this logic is provided for illustrative purposes only and that different logic may be used to accomplish the same results. Moreover, the logic order shown in FIGS. 3 and 4 may be performed in an order other than shown in the figures.

The preferred logic of FIG. 3 is described with reference to the hardware and software environment in FIG. 1. Control begins at block 40 which represents the financial institution computer 6 receiving and processing a transaction concerning an account 8. From block 40, control transfers to block 42 to generate a message including account 8 identification information and a description of the account 8 activity. In preferred embodiments, the financial institution computer 6 will begin preparing the notification message immediately after receiving and processing the transaction. This minimizes any delay in notifying the user of account 8 activity. Control transfers to block 44 which represents the financial institution computer 6 processing the contact information provided with the user account 8.

Control transfers to block 46 which represents the financial institution computer 6 transforming the account activity message into an e-mail message and transmitting the e-mail message to the user provided e-mail address. The user may provide multiple e-mail contacts. Control transfers to block 48 which represents the messaging system 18 receiving the e-mail from the financial institution. Control then transfers to block 50 which represents the messaging system 18 forwarding the e-mail to the user e-mail client 34. As discussed, in preferred embodiments, the user maintains a continual connection with the messaging system 8 while the user is at the e-mail client 34 so that the messaging system 8 forwards e-mail to the user upon receiving the e-mail.

Control then transfers to block 52 which is a decision block representing the messaging system 18 determining whether the user has provided a telephone contact number. If so, control transfers to block 54 which represents the messaging system 18 generating a message to a user telephone number alerting the user that an e-mail has been received. As discussed, in further embodiments the telecommunication notification may include information on the nature of the e-mail, e.g., that it originated from the user financial institution.

From blocks 52 and 54, control proceeds to block 56 which represents the messaging system 18 determining whether the user has provided a pager contact number. If so, control transfers to block 58 which represents the messaging system 18 generating a pager message to alert the user of a received e-mail. With the logic of FIG. 3, the user is notified of account activity at one or more desired electronic contact addresses immediately after the financial institution computer 6 processes the transaction and transmits an e-mail notification of the transaction to the user's messaging system 18. This allows the user to immediately detect fraudulent activity and take appropriate action to prevent further fraudulent instances.

In preferred embodiments, the financial institution computer 6 and messaging system 18 are multi-tasking computers that can execute multiple threads of the logic of FIG. 3 to simultaneously process multiple transactions for different accounts 8 or multiple transactions for a single account 8.

FIG. 4 illustrates logic implemented in the user computer 26. The preferred logic of FIG. 4 is described with respect to the hardware and software environment illustrated in FIG. 2. Preferably, the user computer 26 will maintain a continuous connection via transmission line 30 to the messaging system 18 when the user is using the user computer 26. Control begins at block 60 which represents the user computer 26 receiving an e-mail message. Control transfers to block 62 which represents the user computer 26 transferring the message to the e-mail client 34. The e-mail client 34 may store the message in an inbox file. In certain embodiments, the e-mail client 34 may display a dialog box notifying the user of the e-mail message.

Control then transfers to block 64 which is a decision block representing the user computer 26 determining whether the account notification interface 32 program is running. If the account notification interface 32 program is not running, then control transfers to block 66 which represents the user computer 26 storing the notification message in an e-mail inbox maintained by the e-mail client 34.

If the account notification interface 36 is running, control transfers to block 68 which represents the account notification interface 36 determining whether an application program 32 maintaining information on a user account is running, e.g., a financial spreadsheet, personal finance software, etc. If so, control transfers to block 70; otherwise, control transfers to block 66. Block 70 represents the account notification interface 36 program determining whether the e-mail message is notification of account activity from the financial institution 6. If so, control transfers to block 72; otherwise, control transfers to block 66. In preferred embodiments, an e-mail message of account activity from the financial institution computer 6 could include one or more flag bits that identify the message as concerning account 8 activity.

If the message concerns account 8 activity, at block 72, then the account notification interface 36 transfers the account 8 notification message to the application program 32. Control then transfers to block 74 which represents the application program 32 generating a dialog box in the application program 32 user interface displaying information on the account activity. Control transfers to block 76 which represents the user computer 26 displaying a selectable item in the dialog box requesting the user to update account data maintained by the application program 32 with the recent account activity data provided in the notification message.

Control then proceeds to block 78 which represents the user computer 26 determining whether the user has selected to update account data maintained by the application program 32. If so, control transfers to block 80, which represents the user computer 26 updating the account data maintained by the application program 32 with account activity data included in the notification message. Otherwise, control transfers to block 66, which represents the user computer 26 storing the notification message in an e-mail inbox maintained by the e-mail client 34.

With the logic of FIGS. 3 and 4, the user is immediately notified of account activity by the financial institution computer 6 via the messaging system 18 upon the financial institution computer 6 processing the transaction.

Conclusion

This concludes the description of the preferred embodiments of the invention. The following describes some alternative embodiments for accomplishing the present invention.

In the preferred embodiments, e-mail messages were used to notify the user computer 26 of account activity. However, in alternative embodiments, alternative push type communication technology could be used to inform the user of account activity automatically without the user having to go on-line to request, i.e., pull, the information on account activity.

The financial institution computer 6, clearing house computer 10, and user computer 26 may be comprised of a single computer machine, e.g., a workstation, mainframe, personal computer, etc., or a group of linked computer machines performing the functions described herein. If the financial institution computer 6 is comprised of a plurality of linked computer machines, then one or more computers may store financial account 8 information and one or more of the same or different computers may perform the logic of FIG. 3 to process the transaction and notify the user of account 8 activity, and/or perform the functions of the messaging system 18.

In further embodiments, the user computer 26 may be a laptop or portable computer and the communication line 30 may be a remote transmission line known in the art.

In summary, preferred embodiments disclose a system for notifying a user of account activity. A computer system maintains information on financial accounts and electronic contact information for at least one of the financial accounts. Information on a transaction with respect to one of the financial accounts is received and processed. The computer system then processes the information on the transaction and generates a message providing information on the transaction. The contact information for the financial account involved in the transaction is processed. The message is then electronically transmitted to the location identified by the contact information for the financial account.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method implemented within a financial institution computer system for notifying a user of account activity, wherein the account is maintained within the financial institution computer system, comprising:

(a) maintaining electronic information in the financial institution computer system on financial accounts;

(b) maintaining electronic user contact information for at least one of the financial accounts;

(c) processing information on a completed financial transaction with respect to one of the financial accounts in the financial institution computer system, wherein all completed financial transactions regardless of amount are processed;

(d) generating a message providing information on the completed transaction;

(e) processing the user contact information for the financial account involved in the completed transaction; and (f) electronically transmitting the message immediately from the financial institution computer system to the location identified by the user contact information for the financial account.

2. The method of claim 1, wherein the financial transaction involves a decrement to the financial account.

3. The method of claim 1, wherein the steps of generating the message, processing the user contact information, and electronically transmitting the message are performed immediately after receiving the information on the completed transaction and processing the transaction information.

4. The method of claim 1, further including the steps of:
   determining whether the user contact information includes at least one user e-mail address; and
   upon determining that the user contact information includes at least one user e-mail address, performing the steps of:
   (i) generating the message as an e-mail message; and
   (ii) transmitting the e-mail message to the user e-mail addresses included in the user contact information.

5. The method of claim 4, further comprising the steps of:
   transmitting the e-mail message to a messaging system that maintains e-mail messages sent to the user e-mail address; and
   causing the transmittal of the e-mail message from the messaging system to a computer including an e-mail client, wherein the e-mail client has access to the user e-mail messages maintained in the messaging system.

6. The method of claim 5, further including the step of the causing the messaging system to transmit via a telecommunication means a notification message to the user after receiving the e-mail message, wherein the notification message indicates that the messaging system has received an e-mail transmitted to the user e-mail address.

7. The method of claim 1, further including the steps of:
   determining whether the user contact information includes a telecommunication contact code; and
   upon determining that the user contact information includes a telecommunication contact code, performing the steps of:
   (i) generating the message for transmittal to a user telecommunication receiver accessible through the telecommunication contact code;
   (ii) establishing a connection with the user telecommunication receiver; and
   (iii) transmitting a notification of account activity to the user telecommunication receiver.

8. The method of claim 1, wherein the transaction concerns a change in the user contact information for the financial account and the message provides information on the change to the user contact information to the account.

9. The method of claim 1, wherein a financial institution computer system performs the steps of maintaining financial account information, maintaining electronic user contact information, receiving and processing transaction information, generating the message, processing the user contact information, and transmitting the message, further comprising the steps of:
   transmitting the message providing information on the transaction to a user computer; and
   causing the user computer to display the message after receiving the message in a user interface displayed on a display screen attached to the user computer.

10. The method of claim 9, further comprising the steps of:
    maintaining within a file accessible to the user computer user financial account information;
    running an application program on the user computer that is capable of accessing the file including user financial account information;
    transferring data concerning the transaction from the message to the application program; and
    updating with the application program the user financial account information maintained in the file with the transaction data.

11. A system for notifying a user of account activity, comprising:

(a) a computer system including a database including information on financial accounts and user contact information for at least one of the financial accounts, wherein the financial accounts are maintained in the financial institution computer system;

(b) program logic implemented in the financial institution computer system, comprising:
    (i) means for processing information on a completed transaction with respect to one of the financial accounts in the computer system, wherein all completed financial transactions regardless of amount are processed;
    (ii) means for generating an electronic message providing information on the completed transaction; and
    (iii) means for processing the user contact information for the account involved in the completed transaction; and (c) a communication port including means for electronically transmitting the electronic message immediately from the financial institution computer system to the location identified by the user contact information for the account.

12. The computer system of claim 11, wherein the program logic further includes:

means for determining whether the user contact information includes at least one e-mail address;

means for generating the message as an e-mail message upon determining that the user contact information includes an e-mail address; and means for transmitting the e-mail message to the e-mail address included in the user contact information via the communication port.

13. The computer system of claim 12, wherein the program logic further includes:

means for transmitting the e-mail message to a messaging system that maintains e-mail messages sent to the user e-mail address; and means for causing the transmittal of the e-mail message from the messaging system to a computer including an e-mail client, wherein the e-mail client has access to the user e-mail messages maintained in the messaging system.

14. The computer system of claim 13, wherein the program logic further includes means for causing the messaging system to transmit via a telecommunication means a notification message to the user after receiving the e-mail message, wherein the notification message indicates that the messaging system has received an e-mail transmitted to the user e-mail address.

15. The computer system of claim 11, wherein the program logic further includes:

means for determining whether the user contact information includes a telecommunication contact code;

means for generating the message for transmittal to a user telecommunication receiver accessible through the telecommunication contact code after determining that the user contact information includes a telecommunication contact code;

means for establishing a connection with the user telecommunication receiver; and means for transmitting a notification of account activity to the user telecommunication receiver.

16. The computer system of claim 11, wherein the transaction concerns a change in the user contact information for the account and the message provides information on the change to the user contact information to the account.

17. The computer system of claim 11, further comprising:

a user computer including means for receiving the message providing information on the transaction; and display means attached to the user computer for displaying information on the transaction included in the received message upon receiving the message.

18. The computer system of claim 17, wherein the user computer further includes:

means for maintaining within a file user financial account information;

means for executing an application program that is capable of accessing the file including user financial account information;

means for transferring data concerning the transaction from the message to the application program; and means, performed by the application program, for updating the user financial account information maintained in the file with the transaction data.

19. An article of manufacture for use in programming a financial institution computer system maintaining a database including information on a plurality of user accounts, the article of manufacture comprising a computer usable storage medium having at least one computer program stored therein that causes the financial institution computer system to perform the steps of:

(a) maintaining electronic information on financial accounts in the financial institution computer system;

(b) maintaining electronic user contact information for at least one of the financial accounts;

(c) processing information on a completed transaction with respect to one of the financial accounts, wherein all completed financial transactions regardless of amount are processed;

(d) generating a message providing information on the completed transaction;

(e) processing the user contact information for the financial account involved in the completed transaction; and (f) electronically transmitting the message immediately from the computer system to the location identified by the user contact information for the financial account.

20. The article of manufacture of claim 19, wherein the financial transaction involves a decrement to the financial account.

21. The article of manufacture of claim 19, wherein the steps of generating the message, processing the user contact information, and electronically transmitting the message are performed immediately after processing the completed transaction.

22. The article of manufacture of claim 19, further causing the computer system to perform the steps of:

determining whether the user contact information includes at least one user e-mail address; and upon determining that the user contact information includes at least one user e-mail address, performing the steps of:

(i) generating the message as an e-mail message; and (ii) transmitting the e-mail message to the user e-mail addresses included in the user contact information.

23. The article of manufacture of claim 22, further comprising the steps of:

transmitting the e-mail message to a messaging system that maintains e-mail messages sent to the user e-mail address; and causing the transmittal of the e-mail message from the messaging system to a computer including an e-mail client, wherein the e-mail client has access to the user e-mail messages maintained in the messaging system.

24. The article of manufacture of claim 23, further including the step of transmitting with the messaging system via a telecommunication means a notification message to the user after receiving the e-mail message, wherein the notification message indicates that the messaging system has received an e-mail transmitted to the user e-mail address.

25. The article of manufacture of claim 19, further including the steps of:

determining whether the user contact information includes a telecommunication contact code:

upon determining that the user contact information includes a telecommunication contact code, performing the steps of:

(i) generating the message for transmittal to a user telecommunication receiver accessible through the telecommunication contact code;

(ii) establishing a connection with the user telecommunication receiver; and (iii) transmitting a notification of account activity to the user telecommunication receiver.

26. The article of manufacture of claim 19, wherein the transaction concerns a change in the user contact information for the financial account and the message provides information on the change to the user contact information to the account.

27. The article of manufacture of claim 19, further including at least one user computer program stored in a computer readable storage medium within a user computer, wherein a financial institution computer system performs the steps of maintaining financial account information, maintaining electronic user contact information, receiving and processing transaction information, generating the message, processing the user contact information, and transmitting the message, wherein the message is transmitted to the user computer, and wherein the computer program causes the user computer to perform the step of causing the user computer to display the message after receiving the message in a user interface displayed on a display screen attached to the user computer.

28. The article of manufacture of claim 27, wherein the user computer programs further cause the user computer to perform the steps of:

maintaining within a file accessible to the user computer user financial account information;

running an application program on the user computer that is capable of accessing the file including user financial account information;

transferring data concerning the transaction from the message to the application program; and updating with the application program the user financial account information maintained in the file with the transaction data.

\* \* \* \* \*

UNITED STATES PATENT AND TRADEMARK OFFICE
CERTIFICATE OF CORRECTION

PATENT NO. : 6,064,990
DATED : May 16, 2000
INVENTOR(S) : Goldsmith

It is certified that error appears in the above-indentified patent and that said Letters Patent is hereby corrected as shown below:

Column 5, line 40, delete "NOVELI" and insert --NOVELL--.

Signed and Sealed this

Third Day of April, 2001

Attest:

NICHOLAS P. GODICI

Attesting Officer     Acting Director of the United States Patent and Trademark Office